United States Patent
Zhang et al.

(10) Patent No.: US 8,489,983 B2
(45) Date of Patent: Jul. 16, 2013

(54) METHOD, TERMINAL AND SERVER FOR UPDATING INTERACTIVE COMPONENTS

(75) Inventors: Huiping Zhang, Shenzhen (CN); Guoqiao Chen, Shenzhen (CN); Jian Yang, Shenzhen (CN); Lei Wang, Shenzhen (CN); Shunan Fan, Shenzhen (CN); Ting Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/962,312

(22) Filed: Dec. 7, 2010

(65) Prior Publication Data

US 2011/0078551 A1 Mar. 31, 2011

Related U.S. Application Data

(63) Continuation of application No. PCT/CN2009/072342, filed on Jun. 18, 2009.

(30) Foreign Application Priority Data

Jun. 23, 2008 (CN) .......................... 2008 1 0067989

(51) Int. Cl.
*G06F 17/00* (2006.01)
(52) U.S. Cl.
USPC .......................................................... 715/229
(58) Field of Classification Search
USPC .......................................................... 715/229
See application file for complete search history.

(56) References Cited

U.S. PATENT DOCUMENTS

| 5,357,631 | A  | * | 10/1994 | Howell et al. ........................ 1/1 |
| 7,036,072 | B1 | * | 4/2006  | Sulistio et al. ................. 715/205 |
| 7,099,899 | B2 | * | 8/2006  | Choy et al. ............................ 1/1 |
| 2005/0022237 | A1 | | 1/2005 | Nomura |
| 2006/0130114 | A1 | | 6/2006 | Kwon et al. |
| 2008/0137569 | A1 | | 6/2008 | Sang et al. |

FOREIGN PATENT DOCUMENTS

| CN | 1801679 A | 7/2006 |
| CN | 1976292 A | 6/2007 |
| CN | 101005417 A | 7/2007 |

(Continued)

OTHER PUBLICATIONS

Open Mobile Alliance; "Enabler Test Specification for BCAST Interoperablility Candidate Version 1.0—Jun. 29, 2009", 136 pages.*

(Continued)

*Primary Examiner* — Amelia Rutledge
(74) *Attorney, Agent, or Firm* — Brinks Hofer Gilson & Lione

(57) ABSTRACT

A method, terminal, and server for updating an interactive component are disclosed. The method includes: receiving a notification message delivered by a server, where the notification message carries information about update of an interactive media document; and obtaining an updated interactive media document according to the information about update of the interactive media document. A terminal and a server that apply the method are disclosed. The present disclosure avoids the extra operations and storage consumption brought by the practice of changing the direction of the interactivityMediaDocumentPointer for updating the interactive component. Therefore, when a part of the interactive media documents in the interactive component changes on the server, the terminal updates the changed interactive media documents conveniently in time, the update efficiency is improved, and the update time and resources are saved.

6 Claims, 6 Drawing Sheets

FOREIGN PATENT DOCUMENTS

| | | |
|---|---|---|
| CN | 101023666 A | 8/2007 |
| CN | 101090526 A | 12/2007 |
| CN | 101102547 A | 1/2008 |
| WO | WO 02/073393 A1 | 9/2002 |
| WO | WO 2006/012378 A1 | 2/2006 |
| WO | WO 2006012378 A1 | 2/2006 |

OTHER PUBLICATIONS

Open Mobile Alliance; "Enabler Test Specification for BCAST 1.0 Candidate Version 1.0—Jun. 17, 2009", 109 pages.*

Office Action issued in corresponding European Patent Application No. 09768764.4, mailed Mar. 19, 2013.

OMA, "Mobile Broadcast Services" Candidate Version 1.0, May 29, 2007.

OMA, "Service Guide for Mobile Broadcast Services" Candidate Version 1.0, May 29, 2007.

Chinese Patent No. 101605353, issued on Apr. 17, 2013, granted in corresponding Chinese Patent Application No. 200810067989.2.

* cited by examiner

METHOD, TERMINAL AND SERVER FOR UPDATING INTERACTIVE COMPONENTS

CROSS-REFERENCE TO RELATED APPLICATIONS

This application is a continuation of International Application No. PCT/CN2009/072342, filed on Jun. 18, 2009, which claims priority to Chinese Patent Application No. 200810067989.2, filed on Jun. 23, 2008, both of which are hereby incorporated by reference in their entireties.

FIELD OF THE DISCLOSURE

The present disclosure relates to the communication field, and in particular, to a method, terminal, and server for updating interactive components.

BACKGROUND OF THE DISCLOSURE

Mobile digital multicast broadcast is a new broadcast technology developed on the basis of mobile digital audio broadcast. It introduces the multimedia broadcast service into mobile terminals such as a mobile phone. Mobile Broadcast (BCAST) Services are a standard about the application layer of the mobile multimedia broadcast/multicast service, and is put forward by the Open Mobile Alliance (OMA). The OMA BCAST defines an interaction mechanism, which is implemented through delivery of an interactive media template. The template includes interactive media files. With the mechanism, a user can vote based on the Short Message Service (SMS) and Multimedia Message Service (MMS), subscribe to a Color Ring Back Tone (CRBT), and participate in a program by telephone while the user is watching the program. The interactive media document and the interactive media objects included in it may be delivered along with the program content, or delivered before the user views the program content. If the interactive media document is delivered to the terminal before the user views the program content, when the interactive media document on the server changes, the interactivityMediaDocumentPointer of the interactive data fragments in a Service Guide (SG) needs to point to a new interactive component. In this way, the terminal can discover the change and update the interactive media document.

In the process of implementing the present disclosure, the inventor finds at least the following problems in the prior art: One interactive component is generally made up of multiple interactive media documents; and the interactive media documents have the same GroupID; the interactivityMediaDocumentPointer points to a group of interactive media documents with the same GroupID. If only one interactive media document in a group of interactive media documents changes, the foregoing method for changing the direction of the interactivityMediaDocumentPointer brings extra operations and increases the storage consumption.

SUMMARY OF THE DISCLOSURE

Embodiments of the present disclosure provide a method, terminal and server for updating interactive components. Therefore, when an interactive media document in an interactive component on the server changes, the terminal can update the changed interactive media document in the interactive component conveniently in time.

A method for updating an interactive component in an embodiment of the present disclosure includes: receiving a notification message delivered by a server, where the notification message carries information about update of an interactive media document; and obtaining an updated interactive media document according to the information about update of the interactive media document.

A terminal provided in an embodiment of the present disclosure includes: a receiving unit, configured to: receive a notification message about update of an interactive component from a server, where the notification message carries information about update of an interactive media document; and an obtaining unit, configured to obtain an updated interactive component according to the information about update of the interactive media document.

A server provided in an embodiment of the present disclosure includes: a notifying unit, configured to generate a notification message about update of an interactive component and send it to a terminal, where the notification message carries information about update of an interactive media document; and a first providing unit, configured to: receive a first request sent by the terminal according to the notification message, and send an updated interactive media document to the terminal according to the first request, where the updated interactive media document corresponds to the information about update of the interactive media document.

Through the method, terminal, and server for updating the interactive component herein, when a part of the interactive media documents in the interactive component changes, the terminal updates the changed interactive media documents precisely, without updating the whole interactive component. Therefore, the update efficiency is improved, and the update time and resources are saved.

DETAILED DESCRIPTION OF THE EMBODIMENTS

The embodiments of the present disclosure provide a method, terminal, and server for updating an interactive component, and therefore, when a part of the interactive media documents in the interactive component changes, the terminal updates only the changed interactive media documents precisely. The following describes the embodiments of the present disclosure with reference to accompanying drawings. One of the prerequisites of the following embodiments is that the interactive media documents included in the interactive component are delivered to the terminal before the user views the program content.

Figure 1:
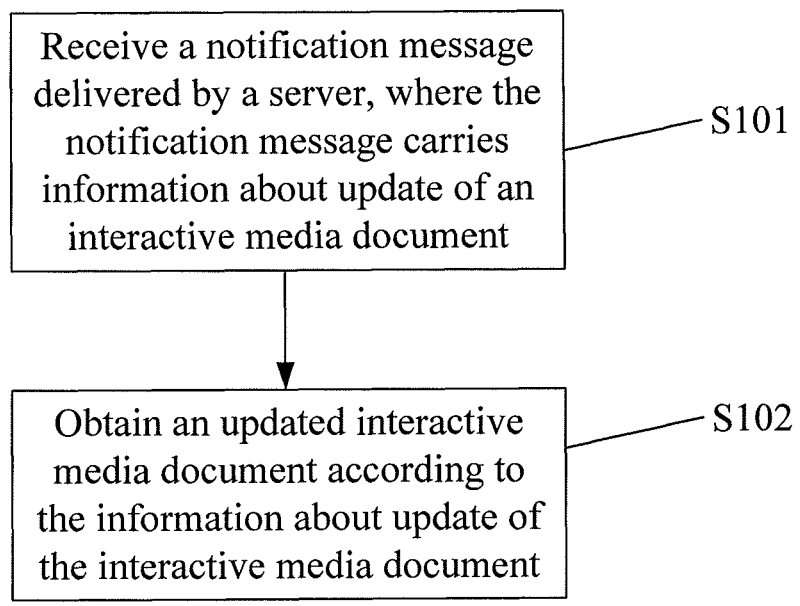
FIG. 1 is a flowchart of a method for updating an interactive component in a first embodiment of the present disclosure.

FIG. 1 is a flowchart of a method for updating an interactive component in the first embodiment of the present disclosure.

In this embodiment, the method for updating an interactive component includes the following steps:

S101. Receive a notification message delivered by a server, where the notification message carries information about update of an interactive media document.

The notification message notifies the terminal to update the interactive component, for example, after an interactive media document is modified or when an interactive media document needs to be inserted. The notification message indicates the interactive media document that needs to be updated.

S102. Obtain an updated interactive media document according to the information about update of the interactive media document.

The notification message may carry additional information, for example, access parameters for obtaining the updated interactive media document. The access parameters indicate how the terminal can obtain the updated interactive media document in the interactive component, and provide the parameters required.

In this embodiment, the terminal only needs to update the corresponding interactive media documents according to the notification message of the server, without updating the whole interactive component. Therefore, the update efficiency is improved, and the update time and resources are saved.

Figure 2:
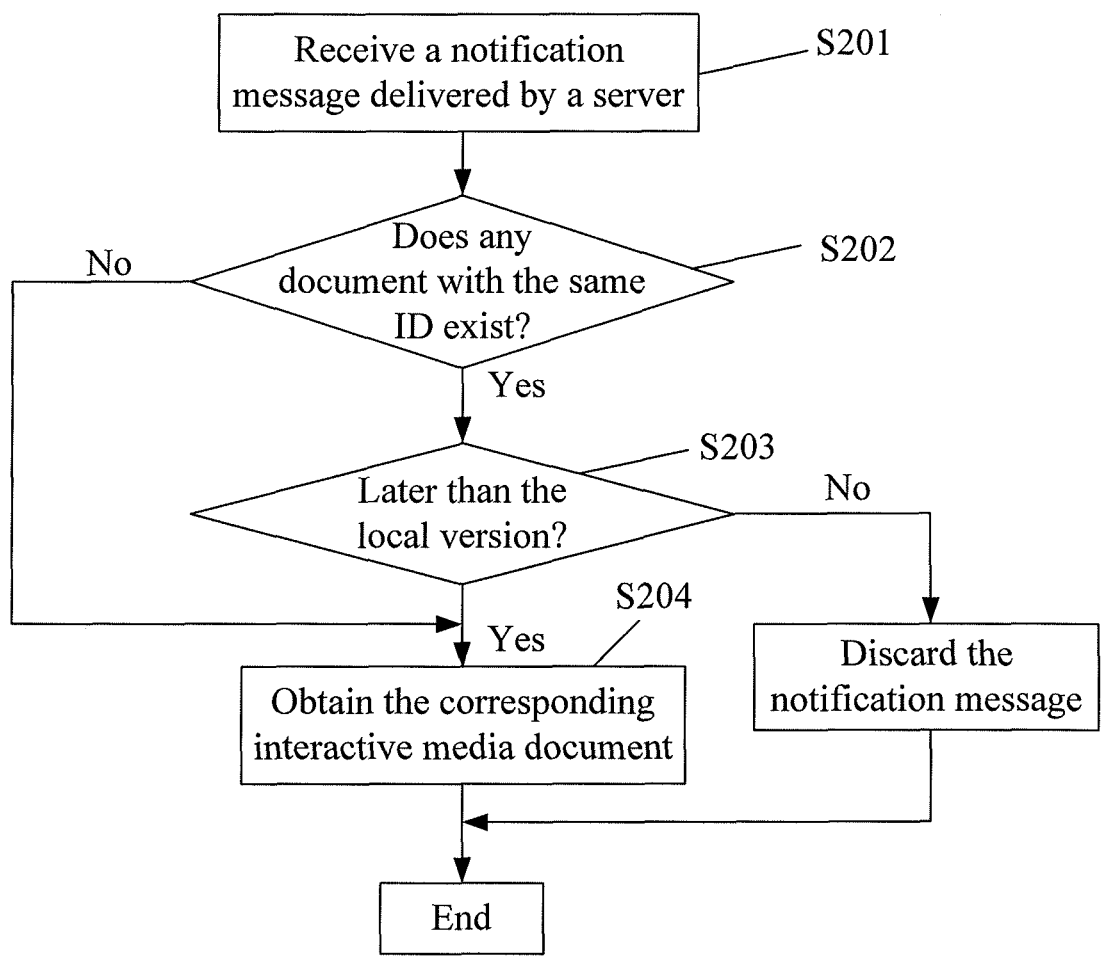
FIG. 2 is a flowchart of a method for updating an interactive component in a second embodiment of the present disclosure.

FIG. 2 is a flowchart of a method for updating an interactive component in the second embodiment of the present disclosure. In this embodiment, the method for updating the interactive component includes the following steps:

S201. Receive a notification message delivered by a server, where the notification message carries information about update of an interactive media document.

The server may be a mobile BCAST server or another network element with the relevant functions. The server may deliver the notification message in many modes, for example, in network-wide broadcast mode. In this case, the server can notify the change of the interactive component to the terminal in time throughout the network. The terminal decides whether to process the notification message according to the relevant information in the notification message and the conditions of the terminal. The broadcast mode is applicable in the networks such as Digital Video Broadcast-Handheld (DVB-H), Multimedia Broadcast/Multicast Service (MBMS), or Broadcast Multicast Service (BCMCS) networks. The server may also deliver the notification message through unicast or multicast, for example, in PUSH mode. The header field of the PUSH message carries X-Wap-Terminal-Id="X-Wap-Terminal-Id" ":" Terminal-ID, which is the ID of the terminal that needs to update the interactive media document. To obtain the terminal state information, the server may instruct the terminal to report its state before delivering the notification; or, every time when the terminal obtains the interactive component from the server, the terminal reports its relevant information to the server, and the server records the state of the terminal that accesses the server.

Further, the notification message may include: access parameters, and document ID and/or version ID of the updated interactive media document. The access parameters indicate how the terminal can obtain the interactive media document, and the address and the port for obtaining the interactive media document. The document ID and version ID indicate the identifier and version of the updated interactive media document respectively.

S202. Determine whether the terminal stores the interactive media document that has the same document ID as the updated interactive media document. If so, proceed to step S203; if not, go to step S204.

S203. Determine whether the version of the updated interactive media document is later than the version of the interactive media document corresponding to the ID in the terminal. If so, proceed to step S204; if not, go to step S205 or end the process.

The "version" property (row 20 in Table 1) of the InteractiveMediaDocmentInfo element in the notification message identifies the carried version of the interactive media document.

S204. Obtain the interactive media document corresponding to the interactive media document ID and the version ID according to the access parameters in the notification message.

The interactive media document may be obtained in many ways:

(1) The access parameters in the notification message may specify the form of the delivery session. Table 1 shows an example of the format of the notification message. The information required for obtaining the interactive media document is specified in the DeliverySession field in the notification message. This field gives the parameters such as IP address and port number used for delivering the interactive media document. The terminal may set up a delivery session according to such information to obtain the interactive media document. When the terminal is unable to access the specified delivery address, the terminal may obtain the interactive media document from the address in the AlternativeURI field through an interactive channel. The prerequisite of this step is that the delivery session is in the validity period (namely, within the time interval defined by the validFrom property and the validTo property of SessionInformation). The session delivery mode may be file delivery mode or streaming delivery mode. The format of the notification message may be:

TABLE 1

| Serial Number | Name | Type | Base | Description | Data Type |
|---|---|---|---|---|---|
| 1 | NotificationMessage | E | | | |
| 2 | id | A | 1 | Notification message identifier | anyURI |
| 3 | version | A | 1 | Notification message version information | unsignedInt |
| 4 | notificationType | A | 1 | Notification type Possible values include: 0: User-oriented message 1: Terminal-oriented message 2-255: Others | unsignedByte |
| 5 | eventType | A | 1 | Notification event type carried in a notification message | unsignedByte |
| 6 | validTo | A | 0 ... 1 | End time of the validity period of the notification message | unsignedInt |

TABLE 1-continued

| Serial Number | Name | Type | Base | Description | Data Type |
|---|---|---|---|---|---|
| 7 | IDRef | E1 | 0...N | Reference to the ID of fragments of main services or content related to the notification message | anyURI |
| 8 | Title | E1 | 0...N | Notification message title | string |
| 9 | Description | E1 | 0...N | Notification description or message | string |
| 10 | PresentationType | E1 | 1 | Presentation type recommended according to priorities<br>Possible values include:<br>0: Notification message of a high priority, which indicates that the terminal can interrupt all applications and present this message immediately;<br>1: Notification message of a middle priority, which indicates that the terminal can overwrite the service being played currently, and present this message immediately;<br>2: Notification message of a low priority, which indicates that the terminal may present this message when required by the user;<br>3-255: Others | unsignedByte |
| 11 | Extension | E1 | 0...N | Additional information related to this notification message | |
| 12 | url | A | 1 | URL of other information related to this notification | anyURI |
| 13 | Description | E2 | 0...N | Description about auxiliary information obtained from web pages | string |
| 14 | SessionInformation | E1 | 0...N | This element defines delivery of the session information; after receiving a notification message that carries "SessionInformation", the terminal accesses the session defined by "SessionInformation", and performs the corresponding action, for example, receives the content | |
| 15 | validFrom | A | 0...1 | Start time of the validity period of the session for receiving data | unsignedInt |
| 16 | validTo | A | 0...1 | End time of the validity period of the session for receiving data | unsignedInt |
| 17 | usageType | A | 0...1 | Object type sent through the specified delivery session<br>Possible values include:<br>0: Unspecified<br>1: Files<br>2: Streams<br>3: SGDD only<br>4: Mixed SGDD and SGDU<br>5: Notification<br>6-127: Reserved for future use<br>128-255: Reserved for proprietary use<br>Default: 0 | unsignedByte |
| 18 | InteractiveMediaDocmentInfo | E2 | 0...1 | Information for transmitting an interactive media document<br>This element is required if usageType is set to 6-InteractiveMediaDocument | |
| 19 | ID | A | 1 | ID of the interactive media document | anyURI |
| 20 | version | A | 1 | Version information of the interactive media document | unsignedInt |
| 21 | DeliverySession | E2 | 0...1 | Delivery session | |
| 22 | ipAddress | A | 1 | Destination IP address of the delivery session | string |
| 23 | port | A | 1 | Destination port of the delivery session | unsignedShort |
| 24 | sourceIP | A | 0...1 | Source IP address of the delivery session | string |
| 25 | transmissionSessionID | A | 1 | Transmission session identifier on the ALC/LCT level | unsignedShort |

TABLE 1-continued

| Serial Number | Name | Type | Base | Description | Data Type |
|---|---|---|---|---|---|
| 26 | TransportObjectID | E3 | 0 . . . N | Transport object ID | positiveInteger |
| 27 | AlternativeURI | E2 | 0 . . . 1 | If the terminal is unable to access the specified delivery session, the terminal uses this Alternative URI to receive the object through an interactive channel | anyURI |

In the notification message above, the modification of the notification message includes: The object type of the delivery session of the interactive media document is added, namely, if the "usageType" property of "sessionInformation" (row 14 in Table 1) is set to 6, it indicates that the object type of the delivery session is InteractiveMediaDocument; the "InteractiveMediaDocumentInfo" field (rows 18-20 in Table 1) is extended to identify the ID and the version number of the interactive media document so that the validity of the notification message can be determined according to the general fields such as "id", "version" and "validTo".

(2) The access parameters in the notification message may specify obtaining of the interactive media document from the interactive channel through the Hyper Text Transfer Protocol (HTTP). Table 2 shows an example of the format of the notification message.

TABLE 2

| Serial Number | Name | Type | Base | Description | Data Type |
|---|---|---|---|---|---|
| 1 | NotificationMessage | E | | | |
| 2 | id | A | 1 | Notification message identifier | anyURI |
| 3 | version | A | 1 | Notification message version information | unsignedInt |
| 4 | notificationType | A | 1 | Notification type Possible values include: 0: User-oriented message 1: Terminal-oriented message 2-255: Others | unsignedByte |
| 5 | eventType | A | 1 | Notification event type carried in a notification message | unsignedByte |
| 6 | validTo | A | 0 . . . 1 | End time of the validity period of the notification message | unsignedInt |
| 7 | IDRef | E1 | 0 . . . N | Reference to the ID of fragments of main services or content related to the notification message | anyURI |
| 8 | Title | E1 | 0 . . . N | Notification message title | string |
| 9 | Description | E1 | 0 . . . N | Notification description or message | string |
| 10 | PresentationType | E1 | 1 | Presentation type recommended according to priorities Possible values include: 0: Notification message of a high priority, which indicates that the terminal can interrupt all applications and present this message immediately; 1: Notification message of a middle priority, which indicates that the terminal can overwrite the service being played currently, and present this message immediately; 2: Notification message of a low priority, which indicates that the terminal may present this message when required by the user; 3-255: Others | unsignedByte |
| 11 | Extension | E1 | 0 . . . N | Additional information related to this notification message | |
| 12 | url | A | 1 | URL of other information related to this notification | anyURI |
| 13 | Description | E2 | 0 . . . N | Description about auxiliary information obtained from web pages | string |
| 14 | InteractiveMediaDocmentInfo | E1 | 0 . . . 1 | Information about an interactive media document | |
| 15 | ID | A | 1 | ID of the interactive media document | anyURI |

TABLE 2-continued

| Serial Number | Name | Type | Base | Description | Data Type |
|---|---|---|---|---|---|
| 16 | version | A | 1 | Version information of the interactive media document | unsignedInt |
| 17 | retrieveURI | E2 | 0 . . . 1 | The terminal uses this URI to receive the interactive media document through an interactive channel | anyURI |

The modification of the notification message in Table 2 is: The information about an interactive media document is added, and the "InteractiveMediaDocumentInfo" field (rows 14-17 in Table 2) is extended to identify the interactive media document ID, version number, and the address for obtaining the interactive media document (retrieveURI). The usage of the fields corresponding to the interactive media document ID and the version number is the same as that in the previous embodiment. When the terminal determines that the interactive media document needs to be updated, the terminal may send an HTTP GET request to the server. In the following example, the terminal needs to obtain an updated document "sportUser.xml" from www.interactiveDoc.com. The format of the request message may be:

```
GET /www.interactiveDoc.com/sportUser.xml HTTP/1.1
Host:www.interactiveDoc.com/
Connection:close
User-agent:Mozilla/4.0
Accept-language:zh-cn
```

Most of the HTTP request messages use the GET method, and the requested object is located at /www.interactiveDoc.com/sportUser.xml.

The server responds to the request sent by the terminal, and returns "sportUser.xml" to the terminal through the following response message:

```
HTTP/1.1 200 0K
Connectlon:close
Date: Thu, 13 Oct 2008 03:17:33 GMT
Server: Apache/2.0.54 (Unix)
Last-Modified:Mon,22 Jun 2008 09;23;24 GMT
Content-Length:6821
Content-Type:text/xml
(da ta data data data data............)
```

"data" at the end of the foregoing message is the content of "sportUser.xml".

S205. Discard the notification message.

In the method provided in this embodiment, the terminal only needs to update the corresponding interactive media documents according to the notification message of the server, without updating the whole interactive component. Therefore, the update efficiency is improved, and the update time and resources are saved.

Figure 3:
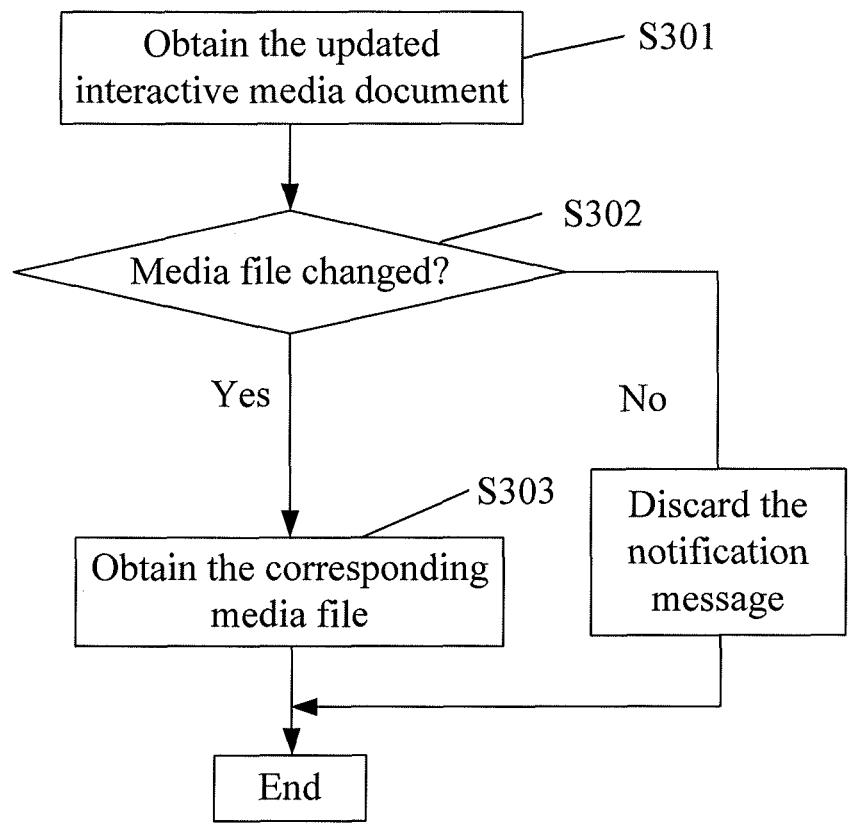
FIG. 3 is a flowchart of a method for updating media files in a third embodiment of the present disclosure.

FIG. 3 is a flowchart of a method for updating media files in the third embodiment of the present disclosure. This method may be applied after the first embodiment or the second embodiment, namely, after the updated interactive media document is obtained. In this embodiment, the method for updating the interactive component may further include the following steps:

S301. Obtain the updated interactive media document.

S302. Determine whether media files have changed. If the media files have changed, proceed to step S303; otherwise, go to step S304 or end the process.

To determine whether the media files have changed, the terminal may selectively obtain information carried in the updated interactive media document. The detailed implementation mode may be as follows:

(1) Obtain the media object group ID carried in the updated interactive media document, for example, media object group ID information. Determine whether a media object group corresponding to the media object group ID (such as ID information) exists in the terminal; if so, go on without obtaining the corresponding media object group again; if not, obtain the media file corresponding to the media object group ID from the server according to the updated interactive media document. This mode is to search for update on the media object group level.

(2) Obtain the media object set ID carried in the updated interactive media document, for example, media object set ID information. Determine whether a media object set corresponding to the media object set ID (such as ID information) exists in the terminal; if so, go on without obtaining the corresponding media object set again; if not, obtain the media file corresponding to the media object set ID from the server according to the updated interactive media document. This mode is to search for update on the media object set level. This mode avoids the operation of obtaining the unchanged media object set repeatedly, which needs to be performed in the previous mode.

(3) Obtain the media object group ID and media object set ID carried in the interactive media document, for example, obtain the ID information. Determine whether a media object group corresponding to the media object group ID information exists in the terminal; if so, go on without obtaining the corresponding media object group again; if not, determine whether a media object set corresponding to the media object set ID information exists in the terminal, and go on without obtaining the corresponding media object set again if any such media object set exists in the terminal, or obtain the media file corresponding to the media object group ID and media object set ID from the server according to the updated interactive media document if no such media object set exists in the terminal.

S303. Obtain the corresponding media file.

S304. Discard the notification message.

This embodiment provides a method for updating media files in interactive media documents. In the case of updating an interactive media document, the media object group included in the updated interactive media document may already exist in the terminal. After obtaining the interactive media document, the terminal searches for the required media files in the local files. If the terminal finds such files, the terminal does not need to obtain them any longer, thus avoiding repeated operations and the waste of resources. This embodiment gives three search modes, namely, searching for update on the media object group level, searching for update on the media object set level, and searching for update on both levels. The three search modes are applicable to different scenarios that require different operation complexity and different operation precision.

This embodiment also provides a computer program, and the codes of the computer program execute these steps: receive a notification message delivered by a server, where the notification message carries information about update of an interactive media document; and obtain an updated interactive media document according to the information about update of the interactive media document. The computer program may further include the codes for executing steps in the method for updating an interactive component in this embodiment. This embodiment also provides a computer-readable medium that stores the foregoing computer program.

Corresponding to the foregoing method embodiment, a server and a terminal for implementing the method are provided in an embodiment of the present disclosure, as detailed below.

Figure 4:
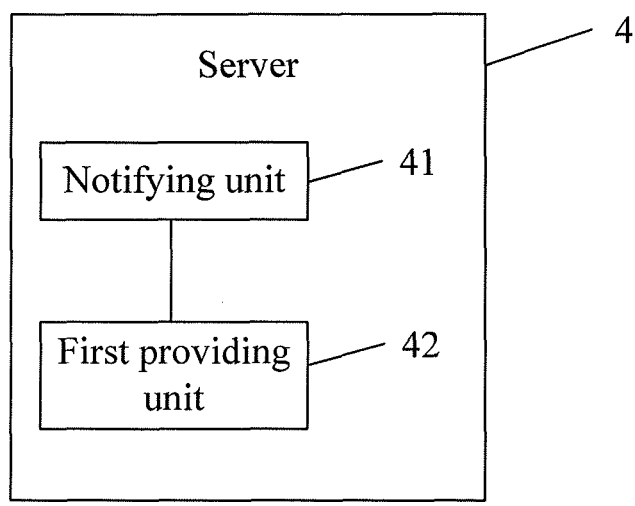
FIG. 4 shows a structural diagram of a server in a fourth embodiment of the present disclosure.

FIG. 4 shows a structure of a server in the fourth embodiment of the present disclosure. The server 4 includes: a notifying unit 41, configured to generate a notification message about update of an interactive component and send it to a terminal, where the notification message carries information about update of an interactive media document; and a first providing unit 42, configured to: receive a first request sent by the terminal according to the notification message, and send an updated interactive media document to the terminal according to the first request, where the updated interactive media document corresponds to the information about update of the interactive media document.

After the notifying unit generates a notification message that carries the information about update of the interactive media document and sends the message to the terminal, the first providing unit receives a response (namely, the first request) returned by the terminal according to the notification message, and sends an interactive media document to the terminal according to the first request, where the interactive media document corresponds to the information about update of the interactive media document.

In another server embodiment of the present disclosure, the notifying unit 41 is further configured to generate a notification message that carries access parameters and information about update of the interactive media document, and send the message to the terminal. The information about update of the interactive media document includes the document ID and version ID of the updated interactive media document. The first providing unit 42 is further configured to: receive the first request sent by the terminal according to the access parameters in the notification message if no interactive media document corresponding to the document ID exists in the terminal, or if an interactive media document corresponding to the document ID exists in the terminal but the version of the updated interactive media document is later than the version of the interactive media document corresponding to the document ID; and send the updated interactive media document to the terminal according to the first request, where the updated interactive media document corresponds to the document ID or corresponds to both the document ID and the version ID.

After the notifying unit 41 generates a notification message that carries the access parameters, the document ID and the version ID of the updated interactive media document and sends the message to the terminal, the first providing unit 42 receives a response (namely, the first request) returned by the terminal according to the notification message, and sends the updated interactive media document that corresponds to the document ID or corresponds to both the document ID and the version ID.

Figure 5:
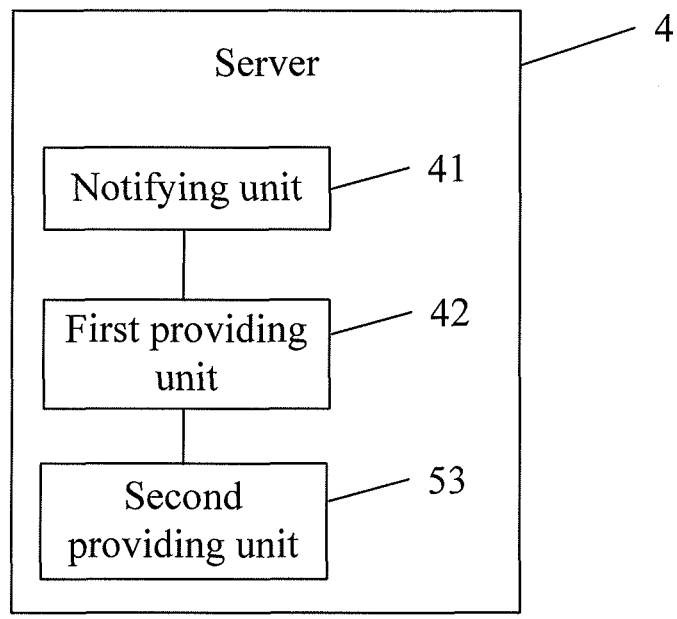
FIG. 5 shows a structural diagram of a server in a fifth embodiment of the present disclosure.

As shown in FIG. 5, in the fifth embodiment of the present disclosure, the server further includes: a second providing unit 53, configured to: receive a second request sent by the terminal for obtaining the media object group ID in the updated interactive media document, send the media object group ID to the terminal, and send the media file corresponding to the media object group ID to the terminal if it is determined that no media object group corresponding to the media object group ID exists in the terminal.

After obtaining the updated interactive media document, the terminal sends a second request to the server. The second providing unit 53 obtains the corresponding media file according to the media object group ID in the updated interactive media document, and sends the media file to the terminal.

In this embodiment, the second providing unit 53 may be further configured to: receive the second request sent by the terminal for obtaining the media object set ID in the updated interactive media document, send the media object set ID to the terminal, and send the media file corresponding to the media object set ID to the terminal if it is determined that no media object set corresponding to the media object set ID exists in the terminal.

In the second embodiment, the second providing unit 53 may be further configured to: receive the second request sent by the terminal for obtaining the media object group ID and the media object set ID in the updated interactive media document, send the media object group ID and the media object set ID to the terminal, and send the media file corresponding to the media object group ID and the media object set ID to the terminal if it is determined that no media object set corresponding to the media object group ID and the media object set ID exists in the terminal.

The server provided in this embodiment notifies the terminal to update the changed interactive media documents in time, and the terminal only needs to obtain the changed interactive media documents precisely to update the interactive media component. Therefore, the update efficiency is improved, and the update time and resources are saved.

Figure 6:
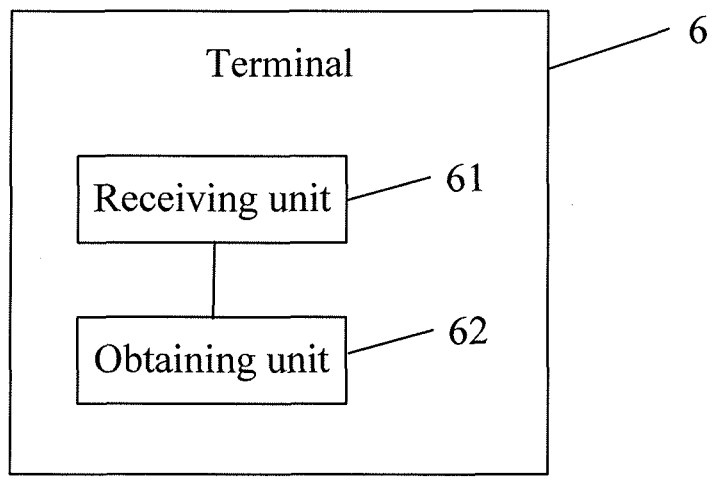
FIG. 6 shows a structural diagram of a terminal in a sixth embodiment of the present disclosure.

FIG. 6 shows a structure of a terminal in the sixth embodiment of the present disclosure. The terminal 6 includes:

a receiving unit 61, configured to: receive a notification message about update of an interactive component from a server, where the notification message carries information about update of an interactive media document; and an obtaining unit 62, configured to obtain an updated interactive media document according to the information about update of the interactive media document.

After the receiving unit 61 receives the notification message, the obtaining unit 62 obtains the updated interactive media document indicated in the notification message.

Figure 7:
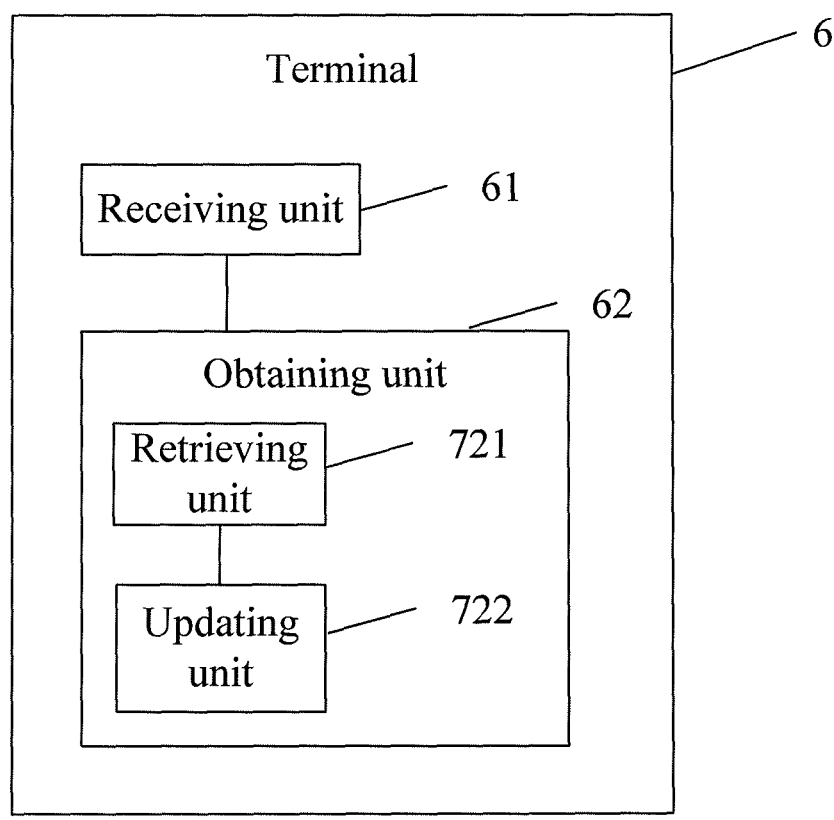
FIG. 7 shows a structural diagram of a terminal in a seventh embodiment of the present disclosure.

As shown in FIG. 7, in the seventh embodiment of the present disclosure, the obtaining unit 62 further includes: a retrieving unit 721, configured to retrieve access parameters from the notification message and retrieve the document ID of the updated interactive media document from the information about update of the interactive media document; and an updating unit 722, configured to obtain the updated interactive media document according to the access parameters if it is determined that no interactive media document corresponding to the document ID exists in the terminal.

After the receiving unit 61 receives the notification message, the retrieving unit retrieves the access parameters and the document ID of the updated interactive media document, and the updating unit 722 obtains the updated interactive media document according to the access parameters if it is determined that no interactive media document corresponding to the document ID exists in the terminal.

Further, the retrieving unit 721 is configured to retrieve the version ID from the information about update of the interactive media document; and the updating unit 722 is further configured to: determine whether the version of the updated interactive media document is later than the version of the interactive media document corresponding to the document ID in the terminal if it is determined that no interactive media document corresponding to the document ID exists in the terminal, and, if so, obtain the updated interactive media document according to the access parameters.

In the seventh embodiment, the retrieving unit 721 obtains the version ID, and the updating unit 722 determines whether the interactive media document corresponding to the document ID exists in the terminal, and obtains the updated interactive media document according to the access parameters if no such interactive media document exists in the terminal. If any such interactive media document exists in the terminal, the updating unit 722 determines whether the version of the updated interactive media document is later than the version of the interactive media document corresponding to the document ID in the terminal, and, if so, obtains the updated interactive media document.

Figure 8:
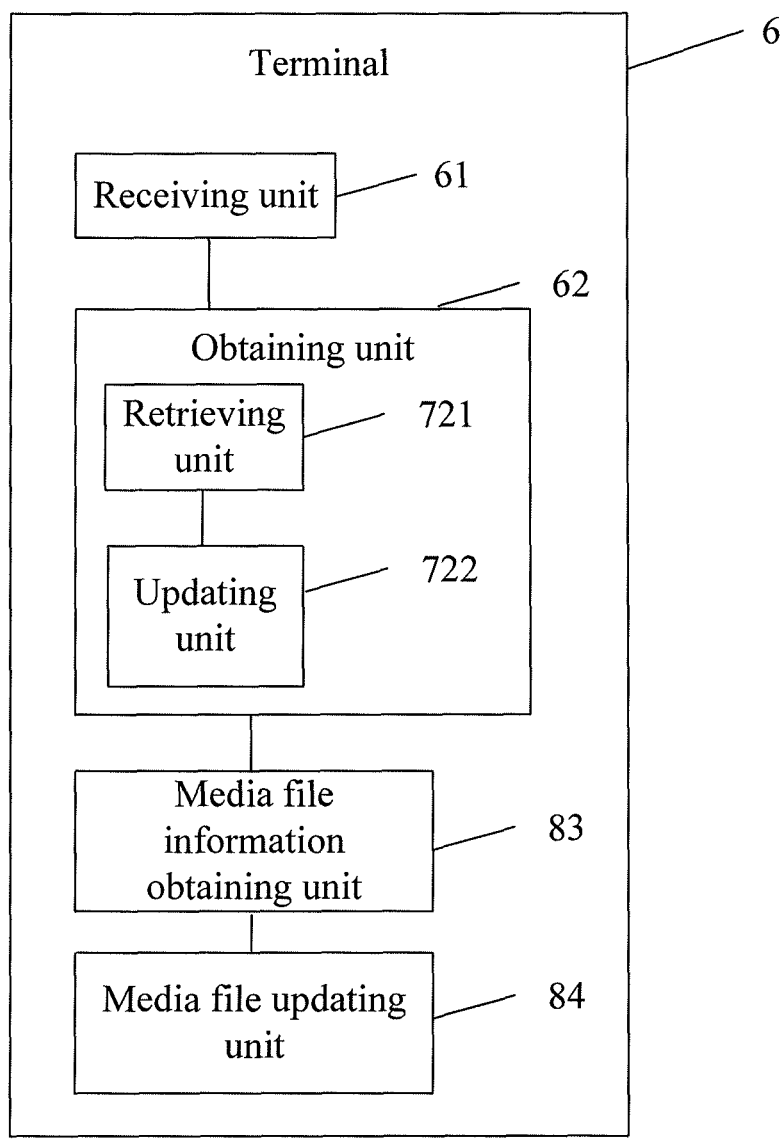
FIG. 8 shows a structural diagram of a terminal in an eighth embodiment of the present disclosure.

As shown in FIG. 8, in the eighth embodiment of the present disclosure, the terminal further includes: a media file information obtaining unit 83, configured to obtain the media object group ID from the updated interactive media document; and a media file updating unit 84, configured to obtain the media file corresponding to the media object group ID from the server according to the updated interactive media document if it is determined that no media object group corresponding to the media object group ID exists in the terminal.

In this embodiment, the media file information obtaining unit 83 may be further configured to obtain the media object set ID from the updated interactive media document; and the media file updating unit 84 may be further configured to obtain the media file corresponding to the media object set ID from the server according to the updated interactive media document if it is determined that no media object set corresponding to the media object set ID exists in the terminal.

In this embodiment, the media file information obtaining unit 83 may be further configured to obtain the media object group ID and the media object set ID from the updated interactive media document; and the media file updating unit 84 may be further configured to: determine whether a media object set corresponding to the media object set ID exists in the terminal if it is determined that no media object group corresponding to the media object group ID exists in the terminal; and obtain the media file corresponding to the media object group ID and the media object set ID from the server according to the updated interactive media document if it is determined that no media object set corresponding to the media object set ID exists in the terminal.

After the updating unit 722 obtains the updated interactive media document, the media file information obtaining unit 83 retrieves the media object group ID and/or the media object set ID from the interactive media document, and the media file updating unit 84 obtains the corresponding media file.

Through the terminal provided in this embodiment, when a part of the interactive media documents in the interactive component changes, the terminal updates the changed interactive media documents precisely, without updating the whole interactive component. Therefore, the update efficiency is improved, and the update time and resources are saved. Further, the corresponding media file can be obtained according to the media file information in the updated interactive media document, thus avoiding repeated operations and the waste of resources.

Persons of ordinary skill in the art understand that all or part of the steps of the method specified in any embodiment of the present disclosure may be implemented by a program instructing relevant hardware. The program may be stored in a computer readable storage medium accessible by at least a processor. When the program runs, the corresponding steps in the foregoing methods are performed. The storage medium may be a Read Only Memory/Random Access Memory (ROM/RAM), a magnetic disk, or a Compact Disk-Read Only Memory (CD-ROM).

Described above are preferred embodiments of the present disclosure. In practice, those skilled in the art may make modifications to the method under the present disclosure to meet the specific requirements. Therefore, it is understandable that the foregoing embodiments are exemplary only, not intended to limit the scope of the present disclosure.

What is claimed is:

1. A method for updating an interactive component pursuant to OMA BCAST protocol, comprising:
   receiving, by a terminal, a notification message delivered by a server, wherein the notification message is adapted to notify the terminal to update the interactive component, and the notification message carries a document identifier, ID, of an updated interactive media document pursuant to OMA BCAST protocol and the notification message further carries access parameters; and
   obtaining, by the terminal, the updated interactive media document according to the access parameters if no interactive media document corresponding to the document ID exists in the terminal;
   obtaining a media object group ID and a media object set ID from the updated interactive media document; and
   determining whether a media object set corresponding to the media object set ID exists in the terminal if no media object group corresponding to the media object group ID exists in the terminal; and
   obtaining a media file corresponding to the media object group ID and the media object set ID from the server according to the updated interactive media document if no media object set corresponding to the media object set ID exists in the terminal.

2. The method according to claim 1, wherein receiving the notification information delivered by the server comprises at least one of the following:
   receiving the notification message delivered by the server through broadcast; and
   receiving the notification message delivered by the server through unicast or multicast.

3. The method according to claim 1,
   wherein the information about update of the interactive media document further comprises a version ID of the updated interactive media document; and
   wherein obtaining the updated interactive media document according to the information about update of the interactive media document further comprises:
   determining whether a version of the updated interactive media document is later than a version of the interactive media document corresponding to the document ID in the terminal according to the version ID after the terminal determines that an interactive media document corresponding to the document ID exists in the terminal, and, if so, obtaining the updated interactive media document according to the access parameters.

4. The method according to claim 1, wherein the step of obtaining the updated interactive media document according to the information about update of the interactive media document comprises:

obtaining the updated interactive media document through a delivery session or a Hyper Text Transfer Protocol (HTTP) according to the information about update of the interactive media document.

5. A terminal for updating an interactive component pursuant to OMA BCAST protocol, comprising:

a receiver, adapted to receive a notification message delivered by a server, wherein the notification message is adapted to notify the terminal to update the interactive component, and the notification message carries information about update of an interactive media document pursuant to OMA BCAST protocol; and an obtaining unit, adapted to obtain an updated interactive media document according to the information about update of the interactive media document;

wherein the obtaining unit comprises:

a retrieving unit, adapted to retrieve access parameters from the notification message and retrieve a document identifier, ID, of the updated interactive media document from the information about an update of the interactive media document; and an updating unit, adapted to obtain the updated interactive media document according to the access parameters if it is determined that no interactive media document corresponding to the document ID exists in the terminal; and the terminal further comprises:

a media file information obtaining unit, adapted to obtain a media object group ID and a media object set ID from the updated interactive media document; and a media file updating unit, adapted to: determine whether a media object set corresponding to the media object set ID exists in the terminal if no media object group corresponding to the media object group ID exists in the terminal; and obtain a media file corresponding to the media object group ID and the media object set ID from the server according to the updated interactive media document if no media object set corresponding to the media object set ID exists in the terminal.

6. The terminal according to claim 5, wherein:

the retrieving unit is further configured to retrieve a version ID of the updated interactive media document from the information about update of the interactive media document; and the updating unit is further configured to: determine whether a version of the updated interactive media document is later than a version of the interactive media document corresponding to the document ID in the terminal after the terminal determines that an interactive media document corresponding to the document ID exists in the terminal, and, if so, obtain the updated interactive media document according to the access parameters.

* * * * *